United States Patent
De Groot et al.

(10) Patent No.: US 9,316,521 B2
(45) Date of Patent: Apr. 19, 2016

(54) METHOD FOR MONITORING A PROCESS SYSTEM HAVING A FIELD BUS IN THE PROCESS AUTOMATION TECHNOLOGY

(75) Inventors: Vincent De Groot, Wehr (DE); Jorg Hahniche, Bad Krozingen (DE); Matthias Romer, Pfeffingen (CH); Raimund Sommer, Maulburg (DE)

(73) Assignee: Endress + Hauser Process Solutions AG, Reinach (CH)

( * ) Notice: Subject to any disclaimer, the term of this patent is extended or adjusted under 35 U.S.C. 154(b) by 782 days.

(21) Appl. No.: 12/733,564

(22) PCT Filed: Aug. 11, 2008

(86) PCT No.: PCT/EP2008/060499
§ 371 (c)(1),
(2), (4) Date: Jun. 28, 2010

(87) PCT Pub. No.: WO2009/033904
PCT Pub. Date: Mar. 19, 2009

(65) Prior Publication Data
US 2010/0287277 A1    Nov. 11, 2010

(30) Foreign Application Priority Data
Sep. 12, 2007   (DE) .......................... 10 2007 043 328

(51) Int. Cl.
*G06F 15/173*    (2006.01)
*G01F 23/00*    (2006.01)
(Continued)

(52) U.S. Cl.
CPC ........ *G01F 23/0076* (2013.01); *G05B 19/0428* (2013.01); *G05B 19/4184* (2013.01);
(Continued)

(58) Field of Classification Search
USPC ........................................................ 709/224
See application file for complete search history.

(56) References Cited

U.S. PATENT DOCUMENTS

| | | | | |
|---|---|---|---|---|
| 5,141,177 A | * | 8/1992 | Wright et al. ............... | 244/17.13 |
| 6,633,782 B1 | * | 10/2003 | Schleiss et al. .................. | 700/26 |

(Continued)

FOREIGN PATENT DOCUMENTS

| | | |
|---|---|---|
| DE | 199 04 893 A1 | 8/2000 |
| DE | 102 52 278 A1 | 5/2004 |

(Continued)

OTHER PUBLICATIONS

Martin Wollschlaeger et al., "Integration of Fieldbus Systems into On-Line Asset Management Solutions based on Fieldbus Profile Descriptions", 4th IEEE International Workshop on Factory Communication Systems, Sweden, Aug. 28-30, 2002.

*Primary Examiner* — Hamza Algibhah
*Assistant Examiner* — James Edwards
(74) *Attorney, Agent, or Firm* — Bacon & Thomas, PLLC

(57) ABSTRACT

A method for monitoring a process plant having a fieldbus of process automation technology, via which a number of field devices exchange with a process control unit PLC telegrams in regular data traffic for process control. The following method steps are executed: telegrams transmitted via the fieldbus to the process control are tapped by a monitoring application, which performs a testing of the telegrams for data relevant for the monitoring application; data relevant for the monitoring application are processed as actual values in a process modeling application, which is part of the monitoring application; and when a significant deviation is determined between desired and actual values, an error signal is generated.

6 Claims, 3 Drawing Sheets

(51) Int. Cl.
    *G05B 19/042* (2006.01)
    *G05B 19/418* (2006.01)
    *G06F 15/177* (2006.01)

(52) U.S. Cl.
    CPC ............ *G05B2219/31121* (2013.01); *G05B 2219/31348* (2013.01); *G05B 2219/31434* (2013.01); *G06F 15/177* (2013.01); *Y02P 90/14* (2015.11)

(56) References Cited

U.S. PATENT DOCUMENTS

| | | | |
|---|---|---|---|
| 7,231,483 B2* | 6/2007 | Gros et al. | 710/305 |
| 7,657,399 B2* | 2/2010 | Miller et al. | 702/183 |
| 8,041,022 B1* | 10/2011 | Andreasen et al. | 379/221.1 |
| 8,886,786 B2 | 11/2014 | Hahniche | |
| 2005/0097209 A1* | 5/2005 | McDonagh et al. | 709/224 |
| 2006/0086196 A1* | 4/2006 | Rieder et al. | 73/861.356 |
| 2006/0136648 A1* | 6/2006 | Gros et al. | 710/305 |
| 2006/0161359 A1* | 7/2006 | Lalla | 702/65 |
| 2007/0043877 A1* | 2/2007 | Seiler | 709/246 |
| 2007/0088981 A1* | 4/2007 | Noble et al. | 714/26 |
| 2011/0270418 A1* | 11/2011 | Law et al. | 700/12 |
| 2013/0073611 A1* | 3/2013 | Wolfe | 709/203 |

FOREIGN PATENT DOCUMENTS

| | | |
|---|---|---|
| DE | 103 55 022 A1 | 6/2005 |
| DE | 10 2005 025 282 A1 | 12/2006 |
| DE | 10 2005 057 000 A1 | 5/2007 |
| WO | 2007074105 A2 | 7/2007 |
| WO | WO 2007/074105 A2 | 7/2007 |

* cited by examiner

METHOD FOR MONITORING A PROCESS SYSTEM HAVING A FIELD BUS IN THE PROCESS AUTOMATION TECHNOLOGY

TECHNICAL FIELD

The invention relates to a method for monitoring a process plant having a fieldbus of process automation technology, a plurality of field devices and a process control unit.

BACKGROUND DISCUSSION

In process automation technology, field devices are often applied, which serve for registering and/or influencing process variables. Examples of such field devices are fill level measuring devices, mass flow measuring devices, pressure- and temperature measuring devices, etc., which, with corresponding sensors, register the process variables, fill level, flow, or temperature.

For influencing process variables, so-called actuators are used. For example, valves influence the flow of a liquid in a section of pipeline or pumps influence the fill level in a container.

Various such field devices are produced and sold by the group of companies, Endress+Hauser.

As a rule, field devices in modern automation technology plants are connected via fieldbus systems (HART, Profibus, Foundation Fieldbus) with superordinated units. These superordinated units serve for, among other things, process control or process visualizing.

Besides process control and process visualizing, fieldbus systems serve also for monitoring process plants. A plant monitoring can occur, for example, with the assistance of a corresponding process control unit (for example Simatic S7, of the firm, Siemens). Process control units obtain plant-relevant data via telegrams, which are transmitted via the fieldbus in regular (cyclic/scheduled) data traffic.

Monitoring-relevant information is frequently obtained with the assistance of process models, which perform a comparison between actual values and desired values.

Normally process models are parts of monitoring applications which are integrated in process control applications.

A disadvantage of monitoring applications integrated in process controllers is that there is a strong dependence on the manufacturers of the process control units. Changes/adaptations cannot be directly performed by the user. Furthermore, all changes and optimizations with respect to the monitoring application always have an effect on the process control application (e.g. performance, reliability, etc.).

Besides such integrated solutions, separated monitoring applications are also known. An example for this is the product FieldCare of the firm, Endress+Hauser. In such case, the data needed for the monitoring application are exchanged not via regular data traffic but instead via non-regular (acyclic/unscheduled) data traffic. This data must be queried from the field devices supplementally to the cyclic data. Besides process information, the monitoring applications also evaluate particular device diagnosis information from the individual field devices. Also, in such case, process models are frequently applied that compare actual values with desired values.

In relatively simple monitoring applications, only the diagnostic information delivered by the field devices is evaluated. In more comprehensive applications, however, process models are also taken into consideration.

Such separated monitoring applications have the disadvantage that the corresponding information must be queried supplementally via the fieldbus, which naturally leads to an additional load on the fieldbus due to the increased bus traffic.

SUMMARY OF THE INVENTION

An object of the invention is therefore to provide a method for monitoring a process plant having a fieldbus of process automation technology wherein the method does not have the aforementioned disadvantages, is especially easily adaptable, and leads to no higher, or essentially no higher, bus loading.

Such object is achieved by the method including the following features: tapping, by a monitoring application, telegrams, which are transmitted via the fieldbus for process control; testing the telegrams for data relevant for the monitoring application; processing data relevant for the monitoring application as actual values in a process modeling application that is part of the monitoring application; and generating an error signal when the process modeling application determines a significant deviation between desired values and actual values.

An essential idea of the invention is to tap by a monitoring application telegrams, which are transmitted via the fieldbus for process control. In the monitoring application, a testing of the telegrams occurs for data relevant for the monitoring application. In the monitoring application, the relevant data are then supplied as actual values to a process modeling application and are processed there and compared especially with desired values. The process modeling application is, in such case, normally part of the monitoring application.

Via the comparison between desired values and actual values, error signals can be generated when significant deviations occur.

An essential advantage of the invention is that the existing data traffic over the fieldbus is tapped, in order to obtain the data needed for monitoring the process plant. Therefore, no additional queries via the fieldbus are necessary, which would lead to a higher bus loading.

Since the monitoring application is a completely separate application, changes/adaptations can easily be performed on it. Such changes have, thus, no effect on the performance of other applications, especially not on process control applications.

In a further development of the invention, additional data are requested by the monitoring application from the field devices when such additional data are necessary for a reliable monitoring.

In a further development of the invention, the monitoring application also comprises two separate monitoring application portions.

These separate monitoring application portions can serve, for example, for monitoring of corresponding process portions within a process plant. Through exchange of data between the two monitoring application portions, process portions that are dependent on one another can also be monitored simply, safely and reliably.

In an additional development of the invention, the monitoring application comprises a plurality of hierarchically graduated, monitoring application portions. In this way, hierarchically dependent process portions can be monitored optimally.

BRIEF DESCRIPTION OF THE DRAWINGS

The invention will now be explained in greater detail on the basis of an example of an embodiment illustrated in the appended drawing.

The figures of the drawing show as follows.

DETAILED DISCUSSION IN CONJUNCTION WITH THE DRAWINGS

Figure 1:
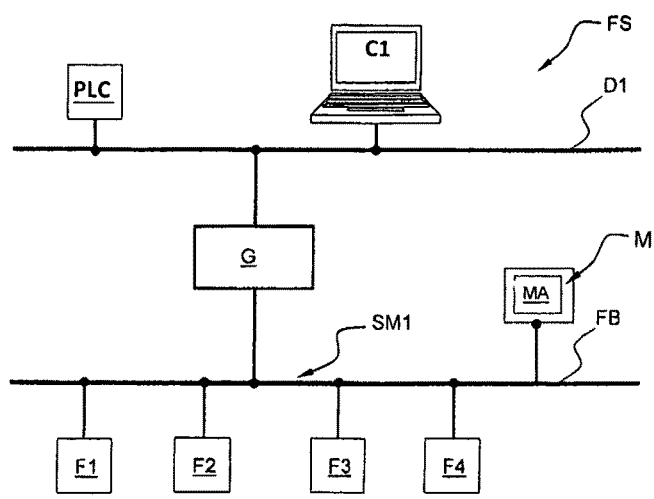
FIG. 1 shows fieldbus system of process automation technology in schematic representation.

FIG. 1 shows a typical fieldbus system FS of process automation technology (Profibus/Foundation Fieldbus) in greater detail. A number of field devices F1, F2, F3 and F4 are connected to a fieldbus FB. Via a gateway G (segment coupler, linking device), the fieldbus FB is connected with a fast data bus D1, to which a computer unit C1 and a control unit PLC are connected. The control unit PLC is for process control with a corresponding control application. The field devices exchange telegrams with the control unit PLC in regular data traffic. In the case of the fieldbus system Profibus, the regular data traffic to the process controller is also called cyclic data traffic.

The computer unit C1 can serve e.g. for process visualizing.

Furthermore, a monitoring unit M is connected with the fieldbus FB. A monitoring application MA runs in the monitoring unit M.

Figure 2:
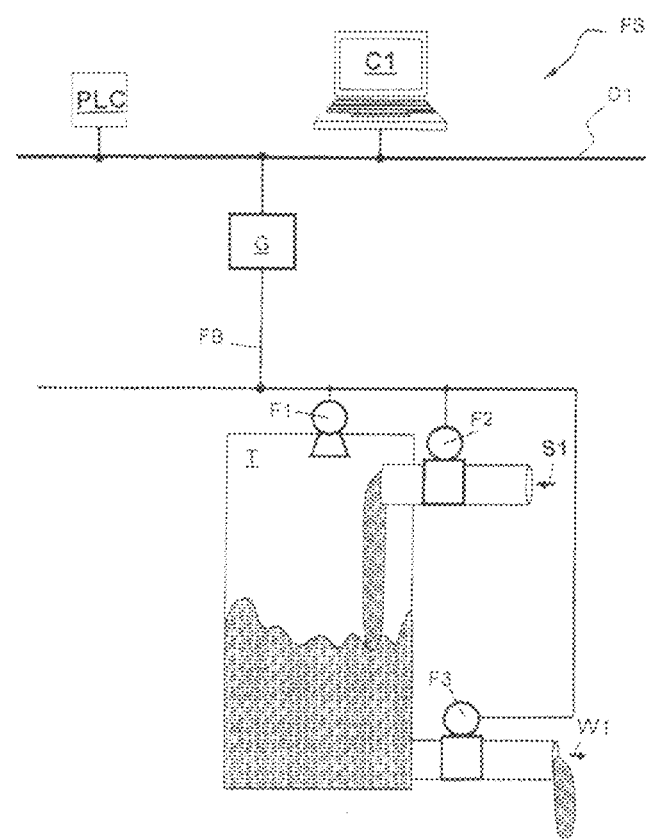
FIG. 2 shows a tank installation in schematic representation.

On the basis of FIG. 2, which shows a tank installation, a simple process model will now be explained. The fill level in a tank T is measured with the assistance of the field device F1, which is a fill-level measuring device. The tank is filled via a supply line S1 and is emptied via a withdrawal line W1. In the two lines S1 and W1, in each case, flow measuring devices F2 and F3, respectively, are arranged. Via a process model, which sets the inflow, the outflow and the fill level, in each case, in relation to one another, the tank installation can be monitored. If significant deviations between the current actual values and the desired values occur, then it is evident that the process is not running properly. This is signaled to the user via an error signal.

The process model can be integrated into the monitoring of the tank installation in a monitoring application which is running in the computer unit C1.

Figure 3:
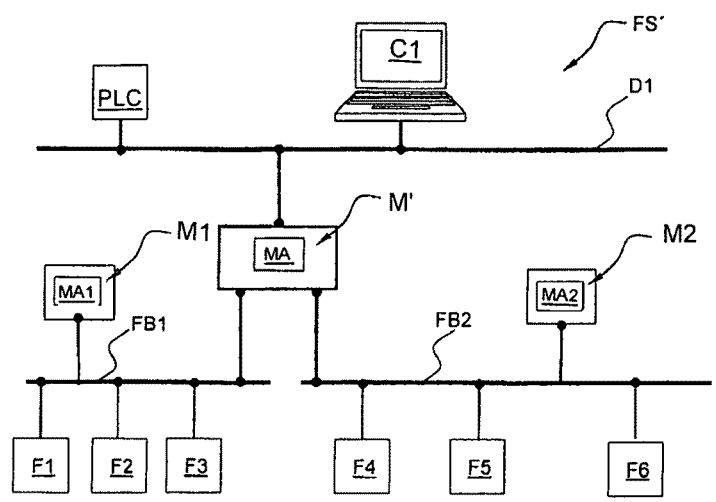
FIG. 3 shows another fieldbus system of process automation technology in schematic representation.

FIG. 3 shows a further fieldbus system FS in greater detail. It shows field devices F1-F3, which are arranged on a heat transfer component (not shown). Three other field devices F4-F6 are arranged on a filtration component (likewise not shown). The field devices are connected, in each case, via fieldbusses FB1 and FB2, respectively, with a monitoring unit M, which also functions as a gateway. Monitoring units M1 or M2 are also connected, respectively, with the two fieldbusses FB1 and FB2.

The method of the invention will now be explained in greater detail on the basis of FIG. 1. The field devices F1-F4 exchange with the control unit PLC, in regular data traffic, telegrams containing process data for process control. These telegrams are according to method step a) tapped by the monitoring application MA. Then, a testing of the telegrams occurs in method step b), which tests whether the telegrams contain data relevant for the monitoring applications MA. When this is the case, these data are processed in method step c) as actual values in a process modeling application. The process modeling application is, in such case, part of the monitoring application.

With help of the process modeling application, an error signal is generated in method step d) when significant deviations are detected between the desired values and the actual values.

If the data that are transmitted via the fieldbus FB via the regular data traffic are not sufficient for an optimal monitoring, or if the regular data simply signal a problem, then additional data can be requested by the monitoring application MA from the field devices. This can be the case e.g. when the required data are not present at all in regular data traffic or when the transmission rate of these data therein is not sufficient. An example here is a Coriolis mass flow meter oscillation frequency, which must be queried more frequently. This is, however, relatively seldom the case, so that the bus traffic is only slightly increased through these additional queries.

According to FIG. 3, the monitoring application MA can also comprise a plurality of monitoring application portions e.g. MA1 for the heat transfer component, MA2 for the filtration component and MA' for a superordinated monitoring application portion, which can run on different field devices or other participants of the fieldbus system FS'.

Each of the two process portions, respectively, "heat exchanger" and "filtration" is monitored by the respective monitoring application portion MA1 and MA2, respectively, which run in the monitoring units M1 and M2, respectively. In an additional monitoring unit M', the hierarchically superordinated monitoring application portion MA' is provided, which ascertains from the data of the subordinated monitoring application portions MA1 and MA2, respectively, e.g. the efficiency of the total process and, in the case of deviations from specified values, generates a corresponding error signal for the total process.

With the method of the invention, a simple plant monitoring is possible with the assistance of a monitoring application, without any, or any significant, increase of the bus traffic. As separated applications, the monitoring applications can be matched or changed independently of the process control applications being used.

The invention claimed is:

1. A method for monitoring a process plant having a fieldbus of process automation technology, via which a plurality of field devices exchange with a process control unit telegrams in regular data traffic for process control, having further a monitoring unit, which is connected to the fieldbus and separate from the process control unit, wherein a monitoring application runs in the monitoring unit and the monitoring unit via the monitoring application performs the following:

tapping of all regular data traffic telegrams, which are exchanged between the plurality of field devices and the process control unit via the fieldbus testing the regular data telegrams for data relevant for the monitoring application, in order to obtain the data needed for monitoring the process plant;

processing the data relevant for the monitoring application as actual values in a process modeling application that is part of the monitoring application; and generating an error signal when the process in the process plant is not running properly by way of the process modeling application that determines a deviation between desired values and actual values by comparing the desired-values and the actual-values.

2. The method as claimed in claim 1, wherein:

the monitoring application, when necessary, requests from the field devices additional data relevant for the process modeling application.

3. The method as claimed in claim 1, wherein:
the monitoring application comprises at least two separate monitoring application portions with, in each case, at least one process modeling application for a process portion.

4. The method as claimed in claim 1, wherein:
the monitoring application portion includes a plurality of hierarchically graduated monitoring application portions, respectively.

5. The method as claimed in claim 1, wherein:
the monitoring application is adapted or changed independently of the process control application being used.

6. A system for monitoring a process in a process plant, comprising:
a process control unit;
a plurality of field devices;
a fieldbus of process automation technology via which said plurality of field devices exchange with said process control unit telegrams in regular data traffic for process control; and
a monitoring unit, which is connected to the fieldbus and separate from said process control unit, wherein:
a monitoring application is provided which is stored in said monitoring unit;
said monitoring application is configured to tap said telegrams of regular data traffic,
said monitoring application further is configured to test said regular data telegrams for data relevant for the monitoring application, in order to obtain the data relevant for monitoring the process plant by the monitoring application;
said monitoring application is configured to process the data relevant for the monitoring application as actual-values in a process modeling application; and
said process modeling application is configured to generate an error signal when a process in the process plant is not running properly by determining a deviation between desired-values and actual-values by comparing the desired-values and the actual-values.

\* \* \* \* \*